United States Patent
Paradise (10) Patent No.: US 8,601,822 B2
(45) Date of Patent: Dec. 10, 2013

(54) PRESSURE-BASED FUEL METERING UNIT

(75) Inventor: Bruce Paradise, Avon, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1502 days.

(21) Appl. No.: 11/769,068

(22) Filed: Jun. 27, 2007

(65) Prior Publication Data

US 2007/0251952 A1    Nov. 1, 2007

Related U.S. Application Data

(62) Division of application No. 10/965,376, filed on Oct. 14, 2004, now Pat. No. 7,251,925.

(51) Int. Cl.
*F02C 7/22* (2006.01)
*F02C 9/00* (2006.01)

(52) U.S. Cl.
USPC .......................................... 60/776; 60/39.281

(58) Field of Classification Search
USPC ............ 73/114.42, 114.43; 60/776, 734, 741, 60/243, 740, 39.281, 773, 772
See application file for complete search history.

(56) References Cited

U.S. PATENT DOCUMENTS

| | | | |
|---|---|---|---|
| 3,789,610 A | 2/1974 | Stone | |
| 3,815,562 A * | 6/1974 | Showalter et al. | 123/442 |
| 3,820,323 A | 6/1974 | Burnell et al. | |
| 3,896,670 A * | 7/1975 | Converse et al. | 73/861.63 |
| 4,030,523 A | 6/1977 | Cram et al. | |
| 4,071,585 A * | 1/1978 | Konishi et al. | 261/36.2 |
| 4,094,613 A * | 6/1978 | Bracken | 415/17 |
| 4,369,749 A * | 1/1983 | Sugi | 123/439 |
| 4,596,156 A * | 6/1986 | Shimizu et al. | 73/863.31 |
| 5,368,273 A * | 11/1994 | Dante | 251/122 |
| 5,647,201 A * | 7/1997 | Hook et al. | 60/258 |
| 5,873,351 A * | 2/1999 | Vars et al. | 123/527 |
| 7,028,478 B2 * | 4/2006 | Prentice, III | 60/645 |
| 2004/0011050 A1 * | 1/2004 | Inoue | 60/773 |

* cited by examiner

*Primary Examiner* — Gerald L Sung
(74) *Attorney, Agent, or Firm* — Carlson, Gaskey & Olds, P.C.

(57) ABSTRACT

A fuel delivery system for use, for example in a gas turbine engine system, includes a fuel metering unit including a main fuel inlet. The fuel metering unit includes fuel pressure and temperature sensors. A cavitating venturi is in fluid communication with the main fuel inlet and includes venturi characteristics such as throat diameter. A fuel nozzle is in fluid communication with the venturi for delivering fuel to the gas turbine engine. A controller is connected to the pressure temperature sensors and is operable to calculate a flow rate of fuel through the nozzle based upon the signals from the pressure and temperature sensors and the fuel and venturi characteristics. A variable cavitating venturi may be arranged within the throat to vary the area and adjust the flow rate through the venturi. The cavitating venturi can also be used at the fuel nozzle to further simplify the fuel delivery system.

11 Claims, 7 Drawing Sheets

PRESSURE-BASED FUEL METERING UNIT

This application is a divisional application of U.S. patent application Ser. No. 10/965,376, filed on Oct. 14, 2004 now U.S. Pat. No. 7,251,925.

BACKGROUND OF THE INVENTION

This invention relates to a fuel delivery system suitable for a gas turbine engine. The invention uses a cavitating venturi to deliver and meter the fuel to the turbine and simplify the system.

Fuel delivery systems for gas turbine engines are expensive and include numerous complex parts. The fuel delivery system is controlled by scheduling fuel flow as a function of an electronic engine controller (EEC) command based upon a fuel metering valve position and a linear variable displacement transducer used to provide feedback.

Conventional fuel controls use a precision-matched fuel metering valve, which is displaced along its axis by servo pressure. A linear variable displacement transducer is used to determine the exact position of the valve, which, in turn, implies its full capacity at that specific displacement. The fuel metering valve does not close off so that it is leak tight, thereby requiring that another minimum pressure and shut-off valve be used downstream of the fuel metering valve. The pressure drop across the fuel metering valve must be kept constant so a pressure regulating valve is used in parallel with the fuel metering valve. A reduced servo pressure is maintained by a servo pressure regulator.

The matched valves, linear variable displacement transducers, and other components, are all quite complicated and prone to high rates of rejection due to their complexity. These components also have high costs and long lead times. Therefore, what is needed is a pressure-based fuel metering unit that eliminates the fuel metering valve, linear variable displacement transducer, and other complicated and expensive components.

SUMMARY OF THE INVENTION

A fuel delivery system for use, for example in a gas turbine engine system, includes a fuel metering unit including a main fuel inlet. The fuel metering unit includes fuel pressure and temperature sensors. A cavitating venturi is in fluid communication with the main fuel inlet and includes venturi characteristics such as throat diameter. A fuel nozzle is in fluid communication with the venturi for delivering fuel to the gas turbine engine. A controller is connected to the pressure and temperature sensors and is operable to calculate a flow rate of fuel through the nozzle based upon the signals from the pressure and temperature sensors and the fuel and venturi characteristics. In this manner, the fuel metering valve, linear variable displacement transducer, and other components of a typical fuel delivery system may be eliminated.

The cavitating venturi may be variable in nature in that an axially adjustable needle may be arranged within the throat to vary the area in the throat thereby adjusting the flow rate through the venturi based upon the resultant area. The variably adjustable venturi may be passive in nature by utilizing a spring, or active in nature by utilizing, for example, piezoelectric actuators. The cavitating venturi can also be used at the fuel nozzle to further simplify the fuel delivery system.

Accordingly, the present invention provides a pressure-based fuel metering unit that eliminates the fuel metering valve, linear variables displacement transducer, and other complicated and expensive components typically found in prior art fuel delivery systems.

These and other features of the present invention can be best understood from the following specification and drawings, the following of which is a brief description.

BRIEF DESCRIPTION OF THE DRAWINGS

FIGS. 6-7B are cross-sectional views of a variable cavitating venturi.

DETAILED DESCRIPTION OF THE PREFERRED EMBODIMENT

Figure 1:
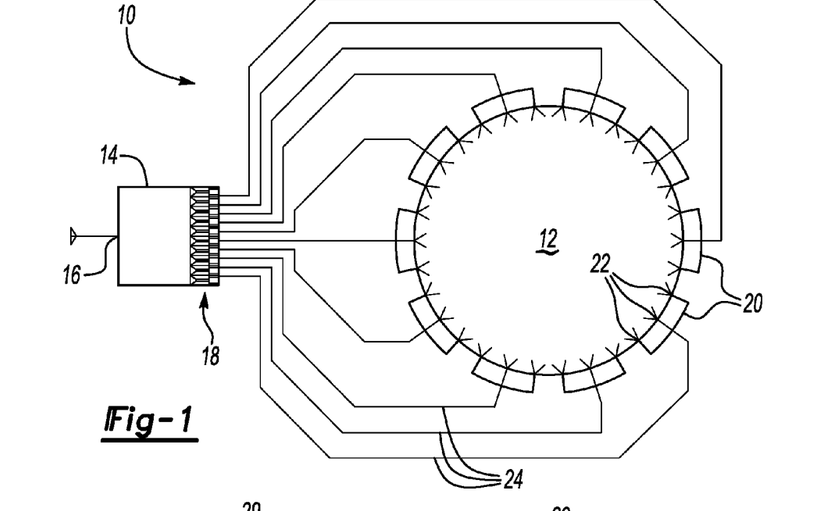
FIG. 1 is a schematic view of a fuel delivery system for a gas driven engine.

A fuel delivery system 10 is shown schematically in FIG. 1. The system 10 is preferably for use in delivering fuel to a gas turbine engine 12. A fuel metering unit 14 receives fuel through a main fuel inlet 16 and delivers the fuel to inventive cavitating venturis 18 that act as flow dividers. The cavitating venturis 18 replace the fuel metering valve and several other components typically used to deliver fuel to the engine 12, as will be appreciated from the discussion below.

Each of the cavitating venturis 18 delivers fuel to a manifold 20 that has multiple nozzles 22. The nozzles 22 spray fuel into the engine 12 in a desired manner, as is well known in the art. The cavitating venturis 18 are connected to the manifolds 20 by fuel lines 24. The fuel delivery system 10 shown in FIG. 1 is only exemplarily and may be modified, as would be appreciated by one of ordinary skill.

Figure 2A:
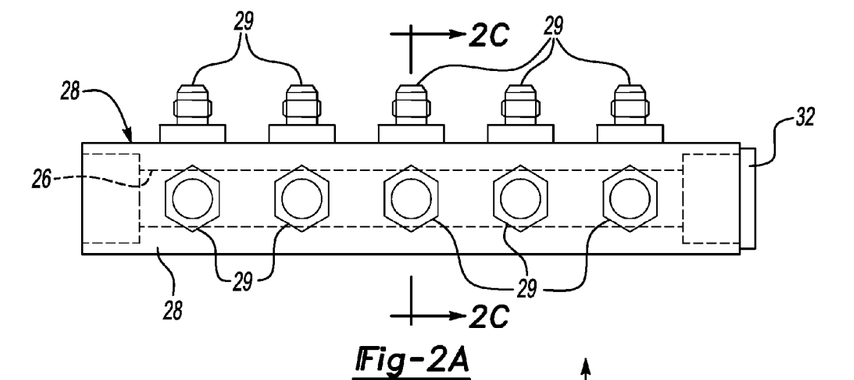
FIGS. 2A-2C illustrate a manifold with the inventive cavitating venturis.
Figure 2B:
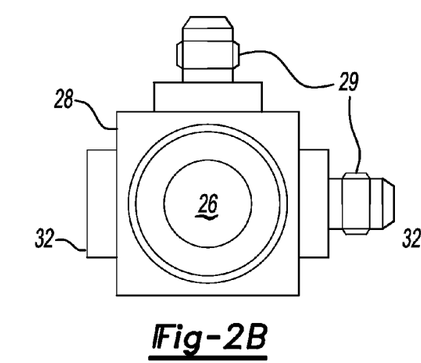
Figure 2C:
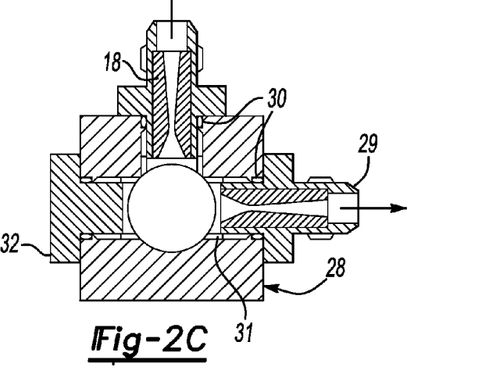

One example arrangement of multiple cavitating venturis 18 is shown in FIGS. 2A-2C. The venturis 18 are mounted on a manifold 28. The venturis 18 are fed with fuel from a common passage 26. Each cavitating venturi 18 is located within a housing 29 that is threadingly secured to a corresponding hole 31 in the manifold 28. O-rings 30 are arranged between the venturis 18 and housings 29 and also between the housings 29 and the manifold 28. Plugs 32 are used in the manifold 28 to seal apertures in the manifold 28 created during machining.

Figure 3A:
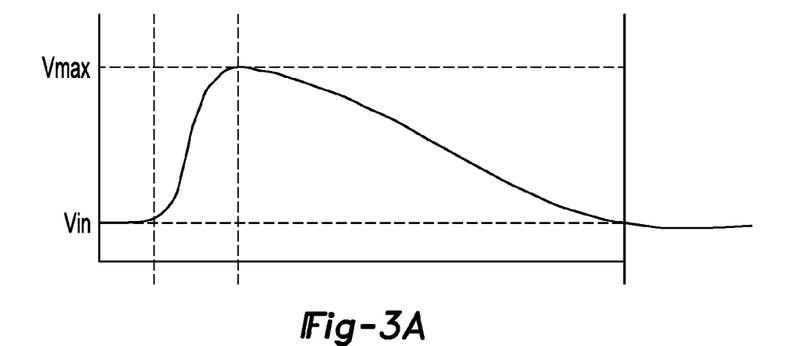
FIGS. 3A and 3B respectively graphically depict volumetric flow and pressure along the length of the cavitating venturi.

The inventive cavitating venturi 18 is shown in more detail in FIG. 3A. The venturi 18 includes an inlet cone 34 that narrows to a throat 36. The venturi 18 includes a recovery section 38 after the throat 36. Cavitating venturis can be used as volumetric flow measuring devices if the pressure, temperature and characteristics of the venturi and operating fluid are known. As a result, for a given engine condition the mass flow rate of fuel to the burner can be governed solely by controlling the venturi inlet pressure. The temperature is measured to determine the effects on fuel density, fuel vapor pressure, and the expansion or contraction of the venturi throat diameter. In the example shown in FIG. 3C, the venturi throat diameter is fixed.

The cavitating venturis in the inventive fuel delivery system 10 operate under the principal that the critical or choked pressure in the throat of each venturi is the vapor pressure of the fluid. The cavitating venturis 18 within a manifold will all see the same critical pressure differential across the throat even though the total recovered pressure downstream from the throat may vary as a function of load on that the particular cavitating venturi. As a result, the flow rate through each cavitating venturi 18 is equal. During cavitation of the fluid flowing through the venturi 10, the fluid does not actually outgas or form damaging bubbles. The fluid reaches the threshold of cavitation and is prevented from expanding its volume further by the fixed surface of the venturi against which the fuel acts. As the fluid passes farther down the venturi 18, the recovery section 38 allows the fuel pressure to build back up to whatever the prevailing back pressure is imposed on the venturi 18 down stream. The cavitating venturi principal described above accurately operates for about 88 percent of the venturis design range. Flow from each cavitating venturi 18 to each manifold 20 are equal to one another within two percent of the flow rate, which is comparable to current mechanical flow dividers.

Figure 3B:
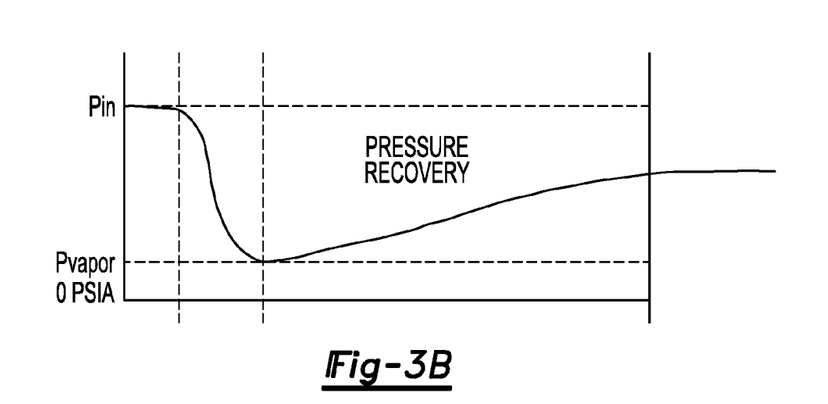
Figure 3C:
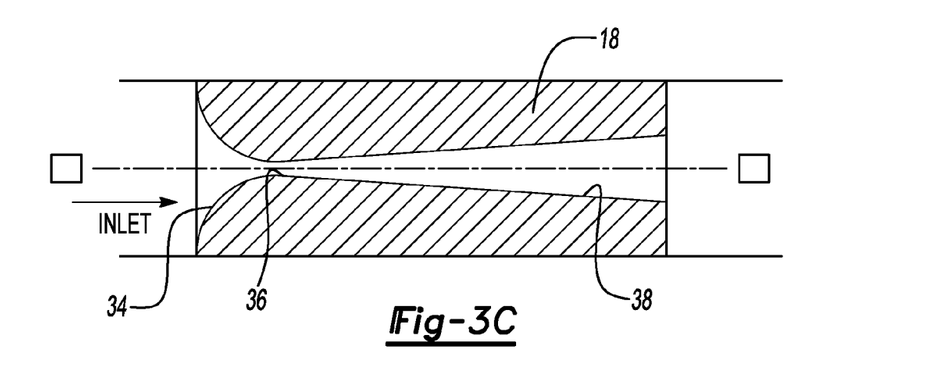
FIG. 3C is a cross-sectional view of the inventive cavitating venturi.

The recovery section 38, in the example shown, has a four degree taper, which allows for very good pressure recovery resulting in a minimum permanent pressure loss across the device. The volumetric flow is self-limiting for any given inlet pressure because the resulting low pressure developed in the throat 36 equals the fluid's intrinsic vapor pressure, as illustrated in FIGS. 3A and 3B. Pressures lower than the vapor pressure cannot be reached because volumetric expansion would be required, which is prevented by the fixed wall of the venturi 18.

Figure 4:
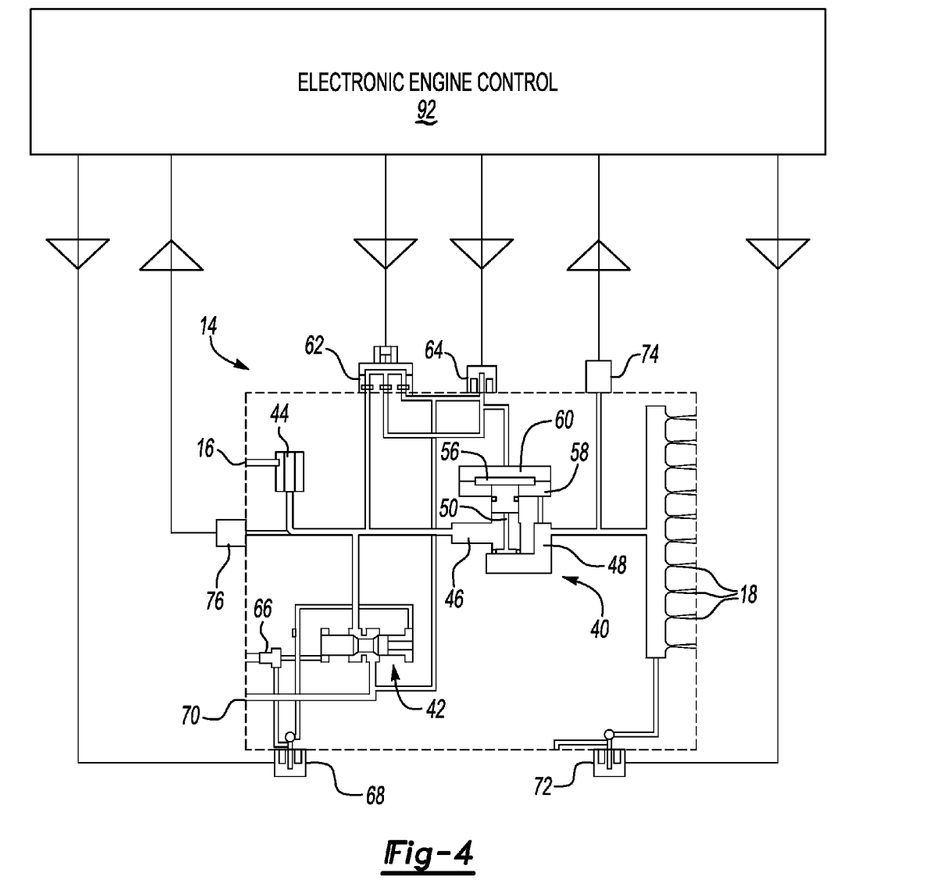
FIG. 4 is a schematic view of a fuel meter unit for the inventive cavitating venturis.

The fuel metering unit 14 is shown in more detail in FIG. 4. In the example shown in FIG. 4, a pressure regulator 40 and system relief valve 42 are used to provide pressurized fuel to the venturis 18. Fuel enters the fuel metering unit 14 through the fuel inlet 16, after which the fuel is filtered by a screen 44. The pressure regulator 40 is of a known configuration, but will be described briefly below. The pressure regulator 40 includes first and second cavities 46 and 48 that are separated by a valve 50. The valve 50 has a first area A1 and a second area A2. The valve 50 is attached to a diaphragm 56 that divides third and fourth cavities 58 and 60. The third cavity 58 is in fluid communication with the second cavity 48. The first area A1 is larger than the second area A2 to ensure that the valve 50 defaults to a closed position. The large diaphragm area as to compared to the areas A1 and A2 ensures that the pressures exerted on the diaphragm have a high control bias over the valve 50.

A pressure control motor 62 regulates the pressure to the pressure regulator 40 within the fourth cavity 60 thereby controlling the amount of force acting on the diaphragm 56, which biases the valve 50 to the closed position. When the pressure exerted on the areas A1 and A2 and the diaphragm 56 from the third cavity 58 exceeds the pressure exerted on the diaphragm 56 from the fourth cavity 60, which is controlled by the pressure control motor 62, the valve 50 will open thereby permitting fuel to flow from the first cavity 46 to the second cavity 48 to deliver fuel to venturis 18.

System pressure within the fuel metering unit 14 is kept at the maximum of 1200 PSIG, for example, by a pilot operator relief valve 66. A windmill bypass solenoid 68 is used to vent the pilot pressure to the system relief valve 42. Fuel from the relief valves 42 and 66 exits a bypass return 70.

The flow of fuel to the venturis 18 is discontinued by actuating an air frame shut down solenoid 64, which vents the pressure exerted on the diaphragm 56 from the fourth cavity 60 enabling the valve 50 to become biased to the closed position, as shown in FIG. 4. Subsequently, a manifold drain solenoid 72 is actuated to drain the fuel back to the tank. A pressure and temperature transmitter 74 and 76 are arranged on the fuel metering unit 14 to monitor the pressure and temperature of the fuel for calculating the fluid flow through the venturis 18. The solenoids, motor, and transmitters 62, 64, 68, 72, 74 and 76 are electrically connected to an electronic engine control (EEC) 92. The EEC 92 calculates the flow rate of fuel through the venturis 18 and operates the fuel metering unit 14 in a desired manner based upon the requirement of the turbine's operating condition.

Figure 5:
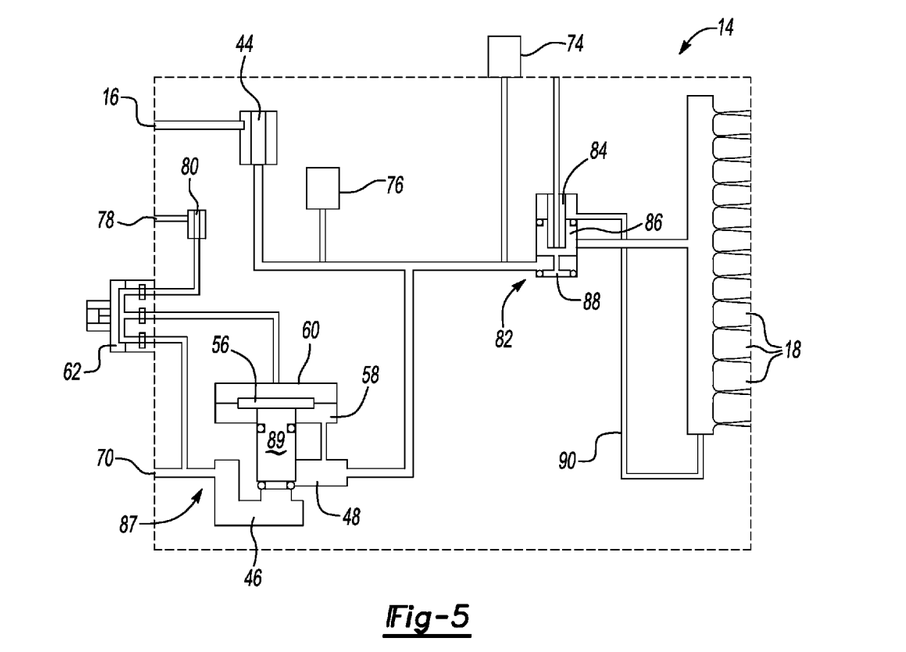
FIG. 5 is a schematic view of an alternative fuel metering unit.

Another fuel metering unit 14 arrangement is shown in FIG. 5. The fuel metering unit 14 controls system pressure using a back pressure regulator 87 and a minimum pressure shut-off 82. A servo pump is used to provide fuel at a servo pump fuel inlet 78 to supply fuel at a higher pressure than the main fuel inlet 16 for any engine operating speed. Fuel from the servo pump fuel inlet 78 is filtered through a fine screen 80.

The minimum pressure shut-off includes a valve 86 biased by a spring 84 to a closed position. The valve 86 is positioned in a desired manner by a stop 88 in the closed position. A drain passage 90 drains the fuel from the venturis 18 to the tank with the valve 86 in the closed position.

Fluid pressure on the valve 86 opens the valve 86 to fluidly connect the fuel inlet 16 with the venturis 18 once the fuel pressure reaches a predetermined pressure. Below the predetermined pressure, the valve 86 is biased shut by the spring 84.

The back pressure regulator 87 relieves pressure from fuel provided by the fuel inlet 16 in response to the fuel pressure from the servo pump fuel inlet 78, which is regulated by the pressure control motor 62. The pressure control motor 62 regulates the fuel pressure applied on the diaphragm 56 in the fourth cavity 60 in a similar manner described above relative to FIG. 4. At a predetermined pressure, which is achieved by adjustment of the pressure control motor 62, the pressure on the diaphragm 56 permits a valve 89 to open bleeding off pressure to the bypass return 70.

Figure 6:
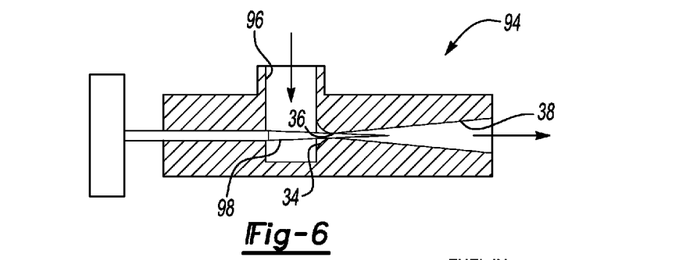

The above cavitating venturis 18 may provide a turn down ratio of approximately 30:1. Such fixed cavitating venturis 18 may not provide a broad enough range to provide the desired volume of fuel from an engine start condition to a max take-off condition. As a result, multiple fixed cavitating venturis 18 may be necessary. Alternatively, a variable cavitating venturi 94, shown in FIG. 6, may be used to provide a higher turn down ratio, for example, 55:1.

Figure 7A:
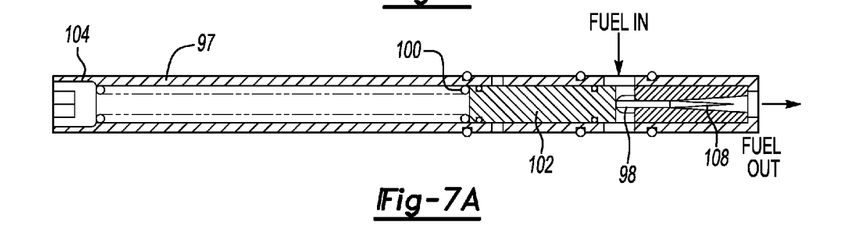

Referring to FIG. 7A, the variable cavitating venturi 94 includes a housing 97 having fuel inlet 96. The flow area in the throat 36 is varied by moving a needle 98 axially relative to the venturi throat 36. The needle 98 is mounted on a shuttle 102 that is biased by a spring 100 to move the needle 98 toward a restricted flow position. An adjustment member 104 is arranged at an end of the housing 97 and is rotationally repositioned to change the compression on the spring 100 to adjust the biasing load on the needle 98. The rear of the shuttle 102 is vented to atmosphere.

Figure 7B:
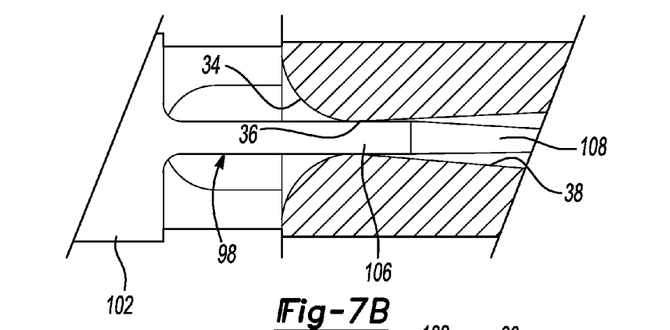

As best seen in FIG. 7B, the needle 98 includes a constant diameter portion 106 supported on the shuttle 102 and a tapered portion 108 extending from the constant diameter portion 106. The tapered portion 108 is designed at a four degree included angle in one example. The venturi 94 is shown in a closed position in FIG. 7B such that the shuttle 102 seals about the inlet cone 34 to prevent fuel flow.

Figures 8A, 8B:
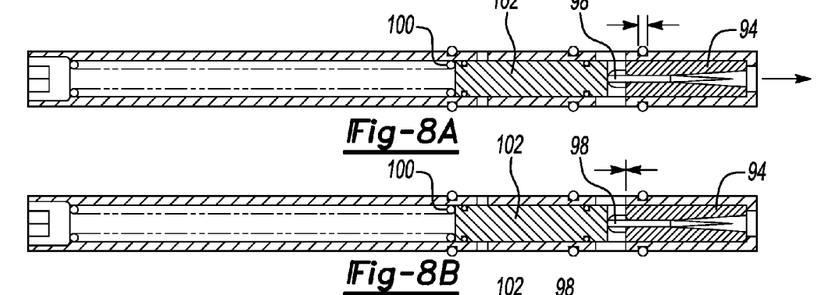
FIGS. 8A-8F are cross-sectional views of the variable cavitating venturi for various pressures flow rates.

Fuel pressure supplied to the variable cavitating venturi 94 by the fuel inlet 96 is varied to vary the flow rate through the venturi 94. FIGS. 8A-8F depict the venturi 94 at various fuel pressures for various gas turbine engine fuel requirement conditions. FIG. 8A depicts the venturi 94 in a closed position in which the shuttle 102 is seated against the body of the venturi, as shown in FIG. 7B. FIG. 8B depicts the venturi 94 in a start condition at which fuel at approximately 48 PSI is provided at the fuel inlet. Fuel at this pressure generates a load one the spring 100 of approximately five pounds. Fuel is provided to the engine at approximately 33 pounds per hour (PPH).

Figure 8C:
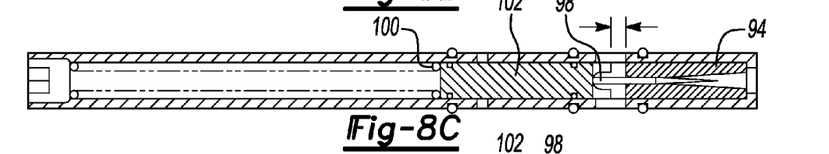
Figures 8D, 8E:
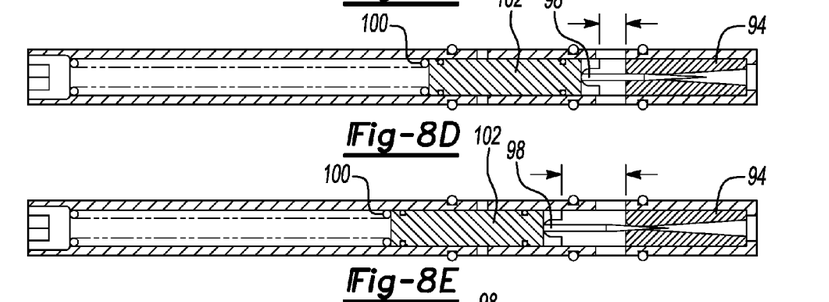
Figure 8F:
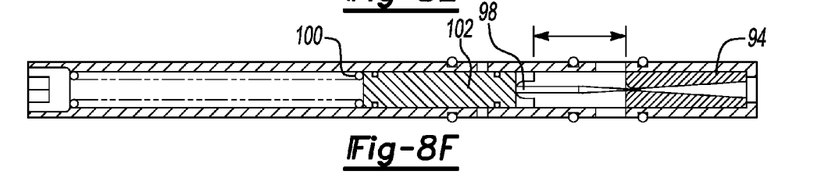

A ground idle condition is depicted in FIG. 8C. The fuel entering the fuel inlet 96 is at a pressure of approximately 171 PSI forcing the needle 98 rearward and generating a load on the spring 100 of approximately 19 pounds. The fuel flows through venturi 94 at approximately 134 PPH. FIG. 8D depicts the venturi 94 in a cruise condition. The needle 98 has moved to a position such that tapered portion 108 is arranged in the throat 36. The fuel enters the fuel inlet 96 at approximately 229 PSI, generating a load on the spring 100 of approximately 332 pounds. Fuel flows through the venturi 94 at approximately 372 PPH. FIG. 8E depicts the venturi 94 in a take-off position. Fuel enters the fuel inlet 96 at approximately 770 PSI, generating a force on the spring 100 of approximately 84 pounds. Fuel flows through the venturi 94 at approximately 1,371 PPH. FIG. 8F depicts a venturi 94 in a maximum take-off condition. The tip of the tapered portion 108 of the needle 98 is barely arranged within the throat 36 for maximum fuel flow. The fuel is provided at the fuel inlet 96 at a pressure of approximately 1,159 PSI, generating a force on the spring 100 at approximately 126 pounds. Fuel flows through the venturi 94 at a rate of approximately 1,894 PPH.

The data given above is only exemplary of one example embodiment. Of course, one of ordinary skill will appreciate that the spring rate, fuel pressure, dimensions of the venturi, and other parameters may be varied to provide different results. Of course, the parameters would be varied to satisfy a particular system. The variable cavitating venturi 94 described above may be incorporated in a fuel metering unit 14 as shown and described relative to FIGS. 4 and 5 or may be incorporated to even a prior art system with some modification.

Figure 9:
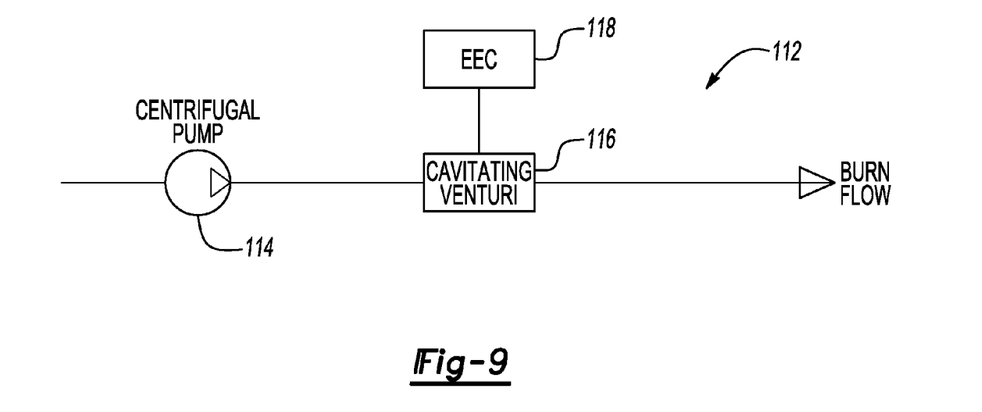
FIG. 9 is a schematic view of a flow control system using the inventive cavitating venturi.

A cavitating venturi 18 or a variable cavitating venturi 94 may be used in any engine fuel delivery system with appropriate modification. For example, as shown in FIG. 9, a system 112 utilizing a centrifugal pump 114 incorporates a cavitating venturi 116 to meter flow through the system 112. The pump 114 has a variable discharge pressure. The cavitating venturi 116 is monitored and controlled by an EEC 118. The system 112 shown in FIG. 9 can be used instead of a typical engine fuel system that utilizes a throttling valve downstream of a metering valve and a head regulator in order to maintain a desired pressure drop across the metering valve. In such a system, an actively controlled variable cavitating venturi 120 of the type shown in FIG. 10 may be employed. The actuator may be hydraulic, electric or another suitable actuator type.

The venturi 120 includes a needle 122 having actuators A-E that are electronically commanded by the EEC 118 to achieve a desired flow rate for any prevailing centrifugal pump discharge pressure to achieve a desired fuel delivery position. The actuators A-E could be hydraulic, in which case the configuration may be other than shown, or preferably, it is controlled by piezoelectric inch worm actuators. The piezoelectric inch worm actuators A-E operate by sequentially energizing the crystals in a particular sequence such that some act as clamps and some act as extenders. By alternately cycling the crystals at high frequency, the device can be made to "walk" by taking a large number of tiny steps. This sequence is illustrated in FIG. 10, and the corresponding voltages to the actuators A-E is shown in FIG. 11.

Figure 10:
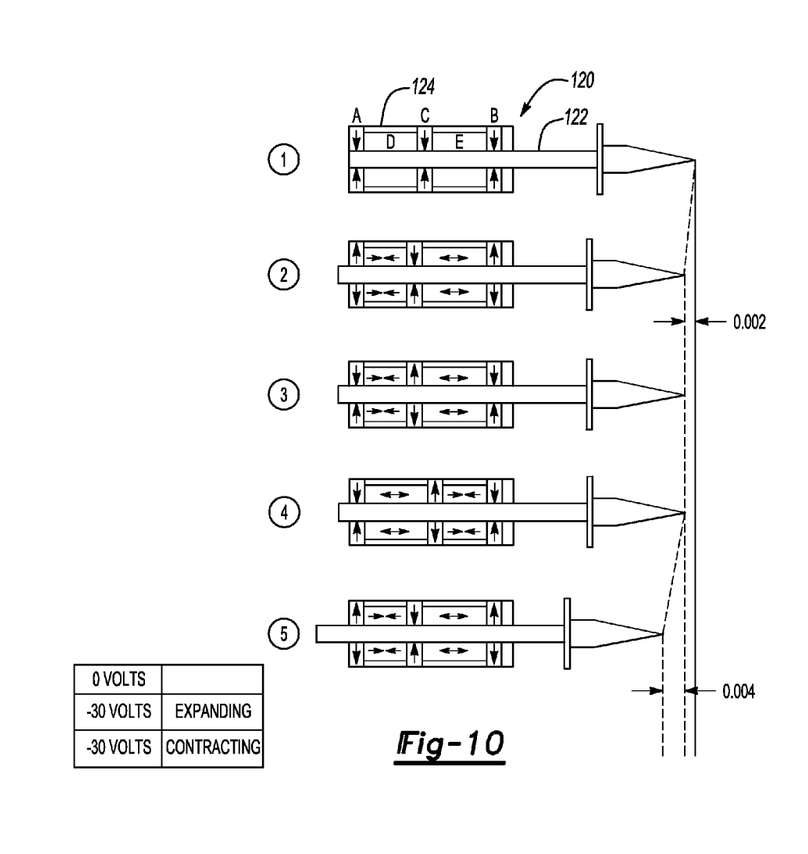
FIG. 10 illustrates cross-sectional views of an actively controlled variable cavitating venturi in various positions.
Figure 11:
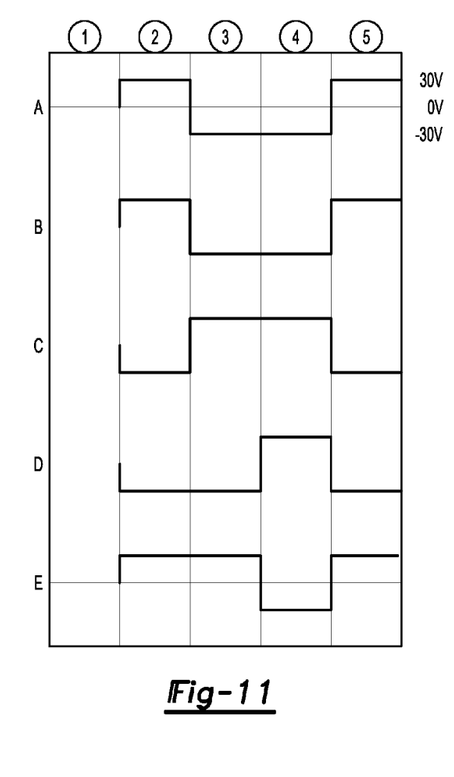
FIG. 11 is a graph corresponding to the voltages of the actuators used to actively control the variable cavitating venturis shown in FIG. 10.

Position 1 of FIG. 10 illustrates the venturi 120 with the needle 122 in a closed position. The actuators A and B act as end brakes, and the actuator C acts a middle brake. The actuators D and E act as extenders to move the needle 122 axially. In position 1, the actuators A-E are deenergized with the actuators A-B defaulting to a locked condition in which the actuators A-C clamp the needle 122. In position 2, the actuators A and B are unlocked, and the actuators C and D are contracted. The actuator E is extended to move the needle 122 rearward to increase the flow through the venturi 120. In positions 2 and 3, the actuators A and B are contracted to lock the needle 122 relative to a housing 124 so that the actuators C-D can be repositioned to move the needle 122 rearward again.

In position 3, the actuator C and E are extended. In position 4, the actuator E is contracted, and the actuator D is extended with the actuator C extended. In position 5, the actuators are energized in the same manner as shown and described relative to position 2 to move the needle 122 further rearward to further increase the flow through the venturi 120.

Figure 12:
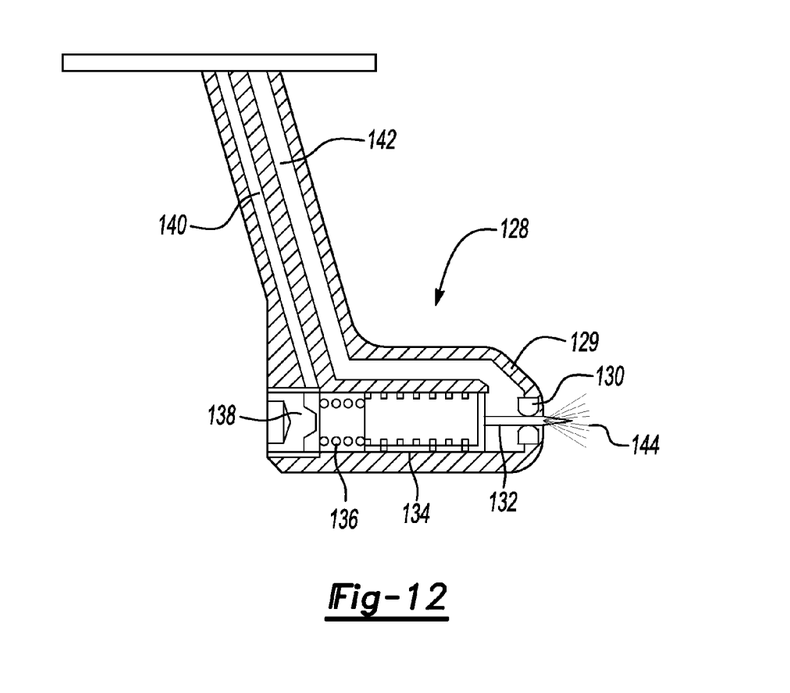
FIG. 12 is a cross-sectional view of a variable cavitating venturi for a fuel nozzle.

In FIG. 1, the venturis 18 are shown supplying fuel to the nozzles 22. However, the venturis may be employed at the nozzles so that the venturis and nozzles may be integrated. Referring to FIG. 12, the inventive fuel nozzle 128 is shown. The nozzle 128 includes a housing 129 having a venturi 130. A needle 132 is arranged within the venturi 130 to vary the flow through the nozzle 128. The recovery section of the venturi 130 has been eliminated to make the venturi 130 more suitable for a fuel nozzle.

The needle 132 is mounted on a shuttle 134 biased by a spring 136. An adjustment member 138 is supported on the housing 129 to adjust the load of the spring 136. The housing 129 includes a fuel inlet 140 for providing fuel to the venturi 130. An air inlet 142 is used to purge the nozzle 128 of fuel to prevent coking during routine engine shut down. The fuel nozzle 128 and the venturi 130 and needle 132 are configured to provide a desired fuel spray pattern 144.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of measuring a fuel flow rate to an engine comprising the steps of:
    a) referencing venturi characteristics;
    b) determining fuel characteristics;
    c) measuring fuel pressure and temperature;
    d) calculating a fuel flow rate based upon the venturi and fuel characteristics and the fuel pressure and temperature, wherein the cavitating venturi characteristics includes throat diameter, and wherein the throat diameter provides an area that is variable; and
    e) adjusting the flow rate through the cavitating venturi based upon the measured fuel pressure and temperature.

2. The method according to claim 1, wherein step d) includes calculating the fuel flow rate from a venturi to a fuel nozzle to determine a fuel delivery rate from the nozzle.

3. The method according to claim 1, wherein step d) includes calculating the fuel flow rate from a fuel nozzle, and the cavitating venturi characteristics are obtained from nozzle design features.

4. The method according to claim 1, wherein the cavitating venturi characteristics include a spring having a spring load applied to a needle arranged in the throat diameter.

5. A method of measuring a fuel flow rate to an engine comprising the steps of:
   a) referencing venturi characteristics, wherein the venturi characteristics include a spring having a spring load applied to a shuttle carrying a needle arranged in a venturi throat diameter;
   b) determining fuel characteristics;
   c) measuring fuel pressure and temperature;
   d) repositioning an adjustment member against the spring to change the spring load against the shuttle; and
   e) calculating a fuel flow rate based upon the venturi characteristics, including spring load, fuel characteristics and the fuel pressure and temperature.

6. The method according to claim 1, wherein step d) includes referencing a commanded actuator position relating to a fuel delivery position of the needle.

7. The method according to claim 1, wherein the fuel characteristics include fuel density.

8. The method according to claim 1, wherein the fuel characteristics include vapor pressure.

9. The method according to claim 5, wherein the shuttle is in fluid communication with atmosphere on a side opposite the needle.

10. A method of measuring a fuel flow rate to an engine comprising the steps of:
    a) referencing cavitating venturi characteristics;
    b) determining fuel characteristics;
    c) measuring fuel pressure and temperature; and
    d) calculating a fuel flow rate based upon the cavitating venturi and fuel characteristics and the fuel pressure and temperature, wherein step d) includes calculating the fuel flow rate from a centrifugal pump and maintaining the fuel flow rate within a desired range throughout a variable discharge pressure from the pump.

11. A method of delivering fuel in a gas turbine engine, comprising the steps of:
    providing a cavitating venturi in fluid communication with a main fuel inlet of a fuel metering unit, the cavitating venturi includes venturi characteristics;
    measuring fuel pressure and temperature in the fuel metering unit;
    calculating a flow rate of fuel through a fuel nozzle based upon the measured fuel pressure and temperature and the venturi characteristics; and
    delivering fuel to the fuel nozzle of the gas turbine engine through the cavitating venturi at the flow rate.

* * * * *

UNITED STATES PATENT AND TRADEMARK OFFICE
CERTIFICATE OF CORRECTION

PATENT NO.        : 8,601,822 B2  
APPLICATION NO.   : 11/769068  
DATED             : December 10, 2013  
INVENTOR(S)       : Paradise Page 1 of 1

It is certified that error appears in the above-identified patent and that said Letters Patent is hereby corrected as shown below:

IN THE CLAIMS:

Claim 1, column 6, line 58: insert --cavitating-- after "referencing"

Claim 1, column 6, line 61: insert --cavitating-- after "the"

Claim 1, column 6, line 66: delete "the" and replace with --a-- (second occurrence)

Signed and Sealed this  
Thirteenth Day of May, 2014

Michelle K. Lee  
*Deputy Director of the United States Patent and Trademark Office*